US012581366B2

(12) United States Patent
Dong

(10) Patent No.: US 12,581,366 B2
(45) Date of Patent: Mar. 17, 2026

(54) METHOD AND APPARATUS FOR TRANSMISSION OF BUFFERED DOWNLINK DATA TRAME UNDER MULTI-CONNECTION

(71) Applicant: BEIJING XIAOMI MOBILE SOFTWARE CO., LTD., Beijing (CN)

(72) Inventor: Xiandong Dong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 377 days.

(21) Appl. No.: 17/774,790

(22) PCT Filed: Nov. 8, 2019

(86) PCT No.: PCT/CN2019/116793
§ 371 (c)(1),
(2) Date: May 5, 2022

(87) PCT Pub. No.: WO2021/088011
PCT Pub. Date: May 14, 2021

(65) Prior Publication Data
US 2022/0394555 A1 Dec. 8, 2022

(51) Int. Cl.
*H04W 28/14* (2009.01)
*H04W 74/02* (2009.01)
(52) U.S. Cl.
CPC ........... *H04W 28/14* (2013.01); *H04W 74/02* (2013.01)
(58) Field of Classification Search
CPC ............................. H04W 74/02; H04W 28/14
See application file for complete search history.

(56) References Cited

U.S. PATENT DOCUMENTS

| | | | |
|---|---|---|---|
| 7,881,752 B1* | 2/2011 | Johnson | H01Q 21/065 |
| | | | 343/893 |
| 9,226,233 B2 | 12/2015 | Yong et al. | |
| 10,079,626 B1* | 9/2018 | Olgaard | H04B 7/0634 |
| 10,972,196 B1* | 4/2021 | Chu | H04B 17/27 |

(Continued)

FOREIGN PATENT DOCUMENTS

| | | |
|---|---|---|
| CN | 109151956 A | 1/2019 |
| CN | 109548119 A | 3/2019 |

(Continued)

OTHER PUBLICATIONS

Indian Patent Application No. 202247032345, Office Action dated Oct. 12, 2022, 6 pages.

(Continued)

*Primary Examiner* — Kenny S Lin
(74) *Attorney, Agent, or Firm* — Cozen O'Connor

(57) ABSTRACT

A method for indicating transmission of a buffered downlink data frame under multi-connection. An access point generates a message frame including first information and second information, and sends the message frame to a station. The first information is configured to indicate that a downlink data frame of the station is buffered at the access point, and the second information is configured to indicate the station to receive the downlink data frame buffered by the access point under multi-connection. A method for receiving a buffered downlink data frame under multi-connection is also disclosed.

16 Claims, 8 Drawing Sheets generating a message frame containing first information and second information, wherein the first information is configured to indicate that a downlink data frame of a station is buffered by an access point, and the second information is configured to indicate the station to receive the downlink data frame buffered by the access point under multi-link

S110 sending the message frame

S120

(56)                    References Cited

U.S. PATENT DOCUMENTS

| | | | | |
|---|---|---|---|---|
| 2004/0184475 A1* | 9/2004 | Meier | .................. | H04W 28/14 |
| | | | | 370/449 |
| 2007/0248034 A1 | 10/2007 | Hsu et al. | | |
| 2012/0188925 A1* | 7/2012 | Lee | .................. | H04W 52/0235 |
| | | | | 370/311 |
| 2013/0301502 A1* | 11/2013 | Kwon | .............. | H04W 52/0216 |
| | | | | 370/311 |
| 2014/0153512 A1* | 6/2014 | Koskela | ............... | H04L 1/1887 |
| | | | | 370/329 |
| 2016/0329989 A1* | 11/2016 | Li | ......................... | H04L 1/0061 |
| 2016/0337968 A1* | 11/2016 | Park | .................. | H04W 52/0216 |
| 2017/0127298 A1 | 5/2017 | Ryu et al. | | |
| 2017/0188306 A1* | 6/2017 | Park | ..................... | H04L 5/0055 |
| 2018/0006699 A1* | 1/2018 | Enescu | ................. | H04L 1/0029 |
| 2018/0076992 A1* | 3/2018 | Nabetani | ............... | H04L 1/1845 |
| 2018/0083793 A1* | 3/2018 | Kim | ........................ | H04L 45/16 |
| 2018/0124750 A1* | 5/2018 | Jung | ..................... | H04L 5/0037 |
| 2018/0213514 A1* | 7/2018 | Zhuang | .............. | H04W 72/541 |
| 2019/0150214 A1* | 5/2019 | Zhou | ..................... | H04W 76/15 |
| | | | | 370/329 |
| 2020/0132857 A1* | 4/2020 | Berger | ............... | H04W 64/003 |

FOREIGN PATENT DOCUMENTS

| | | | | | |
|---|---|---|---|---|---|
| EP | 2785133 | A1 * | 10/2014 | ............ | H04W 84/12 |
| EP | 2785133 | B1 | 6/2017 | | |

OTHER PUBLICATIONS

PCT/CN2019/116793 English translation of International Search Report dated Jul. 17, 2020, 3 pages.
European Patent Application No. 19952096.6, Search and Opinion dated Jul. 6, 2023, 10 pages.

* cited by examiner

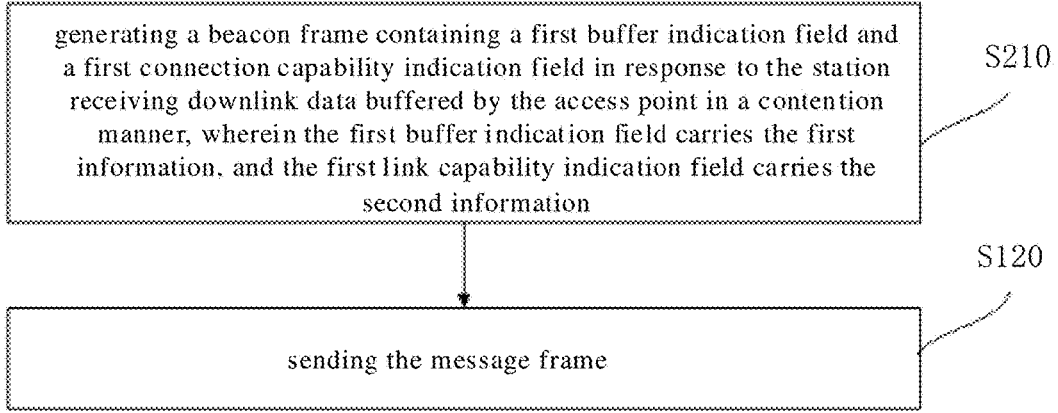

generating a beacon frame containing a first buffer indication field and
a first connection capability indication field in response to the station
receiving downlink data buffered by the access point in a contention
manner, wherein the first buffer indication field carries the first
information, and the first link capability indication field carries the
second information

S210 sending the message frame

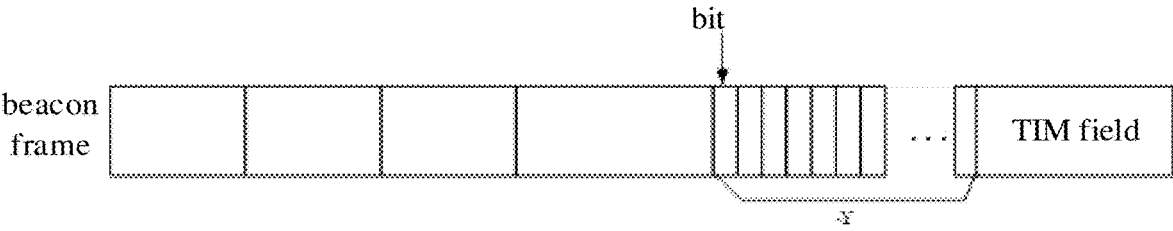

bit beacon
frame

TIM field

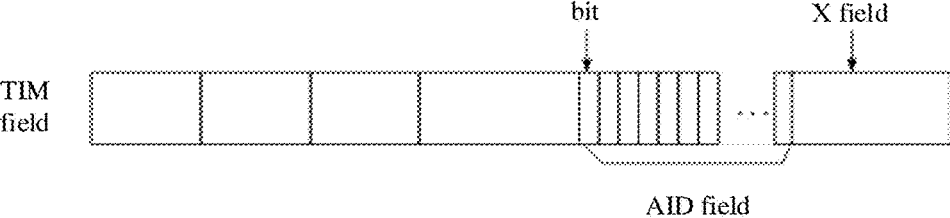

bit                    X field

TIM
field

AID field

FIG. 7

METHOD AND APPARATUS FOR TRANSMISSION OF BUFFERED DOWNLINK DATA TRAME UNDER MULTI-CONNECTION

CROSS-REFERENCE TO RELATED APPLICATION

This application is the US national phase application of International Application No. PCT/CN2019/116793, filed on Nov. 8, 2019, the entire contents of which are incorporated herein by reference.

TECHNICAL FIELD

The disclosure relates to, but not limited to the field of wireless communication technologies, and in particular to a method and an apparatus for indicating transmission of a buffered downlink data frame under multi-link, a method and an apparatus for receiving a buffered downlink data frame under multi-link, a communication device and a storage medium.

BACKGROUND

Research on wireless fidelity (Wi-Fi) technology has become a research hotspot in recent years. The research scope of Wi-Fi technology includes 320 MHz bandwidth transmission, and aggregation and coordination of multiple frequency bands. The vision proposed by the research includes increasing speed, increasing throughput and reducing delay. The main application scenarios include video transmission, augmented reality and virtual reality.

Research on aggregation and coordination of multiple frequency bands in Wi-Fi technology requires devices to communicate in the frequency bands of 2.4 GHz, 5.8 GHZ, and 6-7 GHz at the same time. However, in the related art, the Wi-Fi technology has low spectrum utilization. Therefore, in order to improve user experience, a communication mechanism is required to improve the rate and throughput of data transmission in Wi-Fi technology, and to reduce the delay of data transmission.

SUMMARY

Embodiments of the first aspect of the disclosure provide a method for indicating transmission of a buffered downlink data frame in multi-link, performed by an access point. The method includes:

generating a message frame containing first information and second information, in which the first information is configured to indicate that a downlink data frame of a station is buffered by an access point, and the second information is configured to instruct the station to receive the downlink data frame buffered by the access point in multi-link; and sending the message frame.

Embodiments of the second aspect of the disclosure provide a method for receiving a buffered downlink data frame in multi-link, performed by a station. The method includes:

receiving a message frame containing first information and second information; and receiving a downlink data frame buffered by an access point in multi-link based on the second information, in response to the first information indicating that the downlink data frame of a station is buffered by the access point.

Embodiments of the third aspect of the disclosure provide an access point communication device, including:

an antenna;

a memory; and a processor, connected to the antenna and the memory respectively, and configured to control the antenna to transmit and receive radio signals by executing computer-executable instructions stored on the memory, to implement a method for indicating transmission of a buffered downlink data frame in multi-link, the method comprising:

generating a message frame containing first information and second information, wherein the first information is configured to indicate that a downlink data frame for a station is buffered by the access point, and the second information is configured to instruct the station to receive the downlink data frame buffered by the access point in multi-link; and sending the message frame.

BRIEF DESCRIPTION OF THE DRAWINGS

FIG. 5 is a schematic diagram of a method for indicating transmission of a buffered downlink data frame under multi-link according to an embodiment of the disclosure.

FIG. 6 is a schematic diagram of a beacon frame according to an embodiment of the disclosure.

FIG. 7 is a schematic diagram of a beacon frame according to an embodiment of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

The terms used in the disclosure are only for the purpose of describing specific embodiments, and are not intended to limit the disclosure. The singular forms of "a", "said" and "the" used in the disclosure and appended claims are also intended to include plural forms, unless the context clearly indicates other meanings. It should also be understood that the term "and/or" as used herein refers to and includes any or all possible combinations of one or more associated listed items.

It should be understood that although the terms first, second, and third may be used in this disclosure to describe various information, the information should not be limited to these terms. These terms are only used to distinguish the same type of information from each other. For example, without departing from the scope of the disclosure, the instruction information may also be referred to as the second information, and similarly, the second information may also be referred to as the instruction information. Depending on the context, the word "if" as used herein can be interpreted as "when", "while" or "in response to determining".

In order to better describe any embodiment of the disclosure, the embodiment of the disclosure takes an application scenario of an intelligent ammeter control system as an example for illustrative description.

Figure 1:
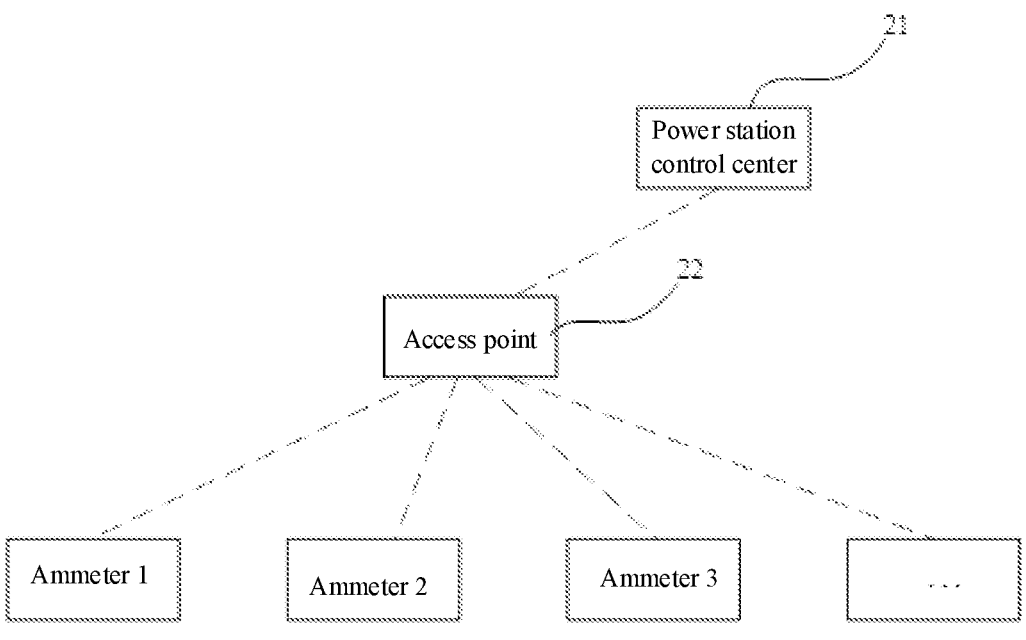
FIG. 1 is a schematic diagram of an application scenario of an intelligent ammeter control system according to an embodiment of the disclosure.
Figure 2:
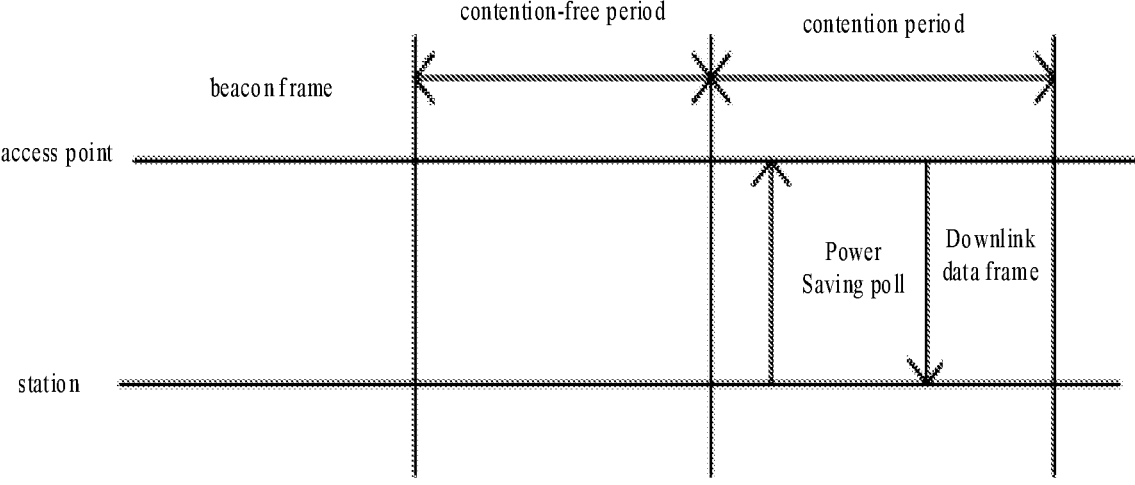
FIG. 2 is a schematic diagram of a method for obtaining buffered data by a station in a dormant state according to an embodiment of the disclosure.

As illustrated in FIG. 1, the embodiment of the disclosure provides an application scenario of an intelligent ammeter control system. Referring to FIG. 2, the intelligent ammeter control system includes a power station control center 21, an access point (AP) 22, an ammeter 1, an ammeter 2 and an ammeter 3. It should be noted that the power station control center may be an intelligent gateway in the intelligent ammeter control system. The AP may be a router. The ammeter is a station (STA) in the embodiment of the disclosure. According to the scheduling requirement of the intelligent control system, the power station control center can send a scheduling instruction to the AP, to instruct the AP to configure the stored buffered data to the ammeters. In order to save power, the ammeter may be in a dormant state, and the ammeter in the dormant state still needs to acquire buffered data from the AP to execute corresponding application functions in real time.

FIG. 2 is a schematic diagram of a method for obtaining buffered data by a station in a dormant state according to an embodiment of the disclosure. As illustrated in FIG. 2, before entering the dormant state, the station will negotiate a wake-up period with the AP to monitor the beacon frame. The station wakes up periodically to monitor the beacon frame sent by the AP, and parses the traffic indication map (TIM), to know whether a downlink data frame for the station is buffered by the AP. If the downlink data frame for the station is buffered by the AP, the station sends a power saving poll (PS-poll) frame during the contention period, to obtain resources for receiving the downlink data buffered by the AP. There are two ways to send the PS-poll frame.

In the first way, the station sends the PS-poll frame under the link of receiving the beacon frame, and receives the buffered downlink data frame under multiple links simultaneously.

Figure 3:
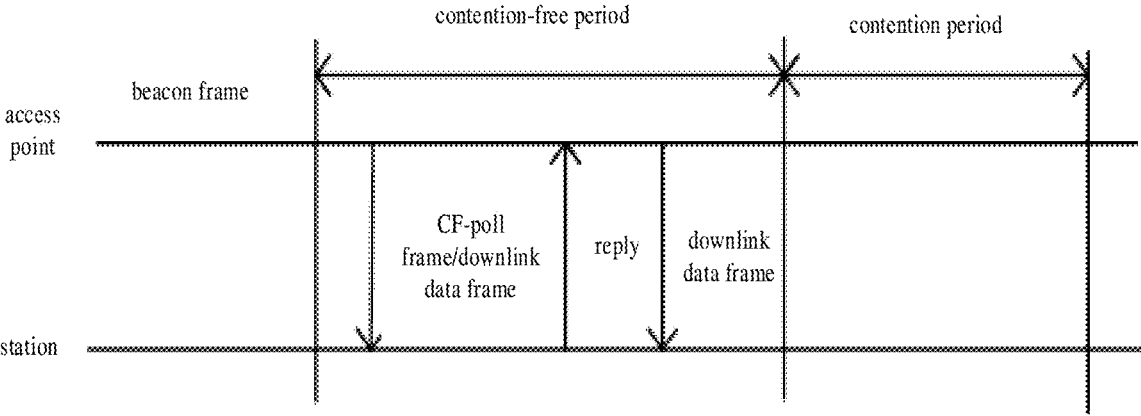
FIG. 3 is a schematic diagram of a method for obtaining buffered data by a station in a dormant state according to an embodiment of the disclosure.

In the second way, the PS-poll frame is sent under each link, and the buffered downlink data frame is received independently under each link. In this way, the receiving time of the buffered downlink data frame under different links may be the same or different. FIG. 3 is a schematic diagram of a method for obtaining buffered data by a station in a dormant state according to an embodiment of the disclosure. As illustrated in FIG. 3, before entering the dormant state, the station will negotiate the wake-up period with the AP, and periodically obtain the downlink data frames buffered by the AP within a service period (SP) specified by the AP. Here, the station negotiates the wake-up period with the AP. During the contention-free period, the AP sends the downlink data frame buffered by the AP through the CF-poll frame. Here, the CF-poll frame is sent by the AP to the station, which may be sent in each frequency band, and the station receives and buffers the downlink data frame based on the CF-poll frame.

Two ways shown in FIG. 2 and FIG. 3 both are for the case of performing data transmission under a single link. In order to improve the spectrum utilization efficiency of the system, increase the rate and throughput of data transmission between the AP and the station, and reduce the delay of the data transmission, the devices need to communicate with each other under multi-link. Therefore, it is necessary to enhance the above two ways to adapt to the communication under multi-link. The multi-link may refer to multiple bandwidths under one frequency band or multiple frequency bands.

The frequencies used by the multiple links are different, for example, the frequencies used by the multiple links may be one or more of 2.4 GHz, 5.8 GHz, and 6-7 GHz.

Figure 4:
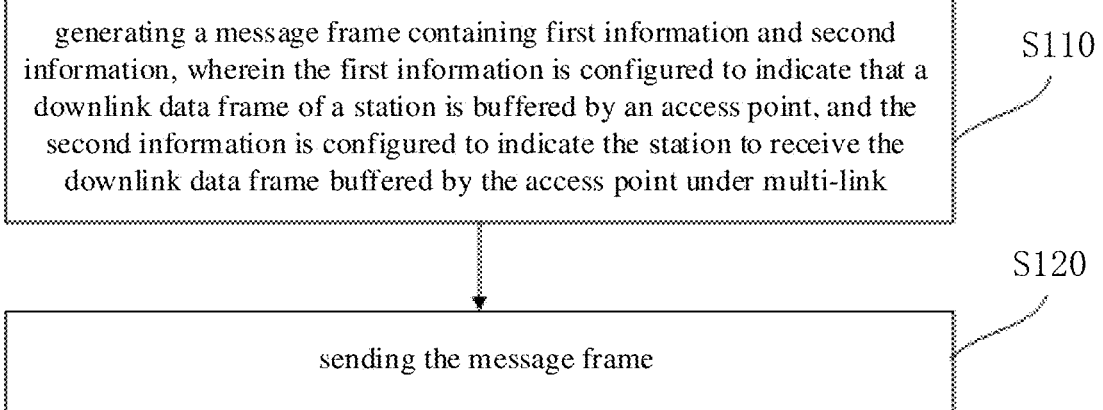
FIG. 4 is a schematic diagram of a method for indicating transmission of a buffered downlink data frame under multi-link according to an embodiment of the disclosure.

FIG. 4 is a schematic diagram of a method for indicating transmission of a buffered downlink data frame under multi-link according to an embodiment of the disclosure. The method includes the following steps.

In S110, a message frame containing first information and second information is generated, in which the first information is configured to indicate that a downlink data frame of a station is buffered by an AP, and the second information is configured to instruct the station to receive the downlink data frame buffered by the AP under multi-link.

In this embodiment, the message frame may be a message frame sent by the AP to the station. For example, in the intelligent ammeter control system, a router device is the AP and an intelligent ammeter is the station, and the message frame may be the message frame sent by the router device to the intelligent ammeter. Here, the message frame may be a beacon frame or a CF-poll frame. Multi-link can refer to multiple bandwidths under one frequency band/multiple frequency bands, and can be understood as multiple channels for transmitting data. Each link in the multi-link corresponds to one channel for transmitting data, and each channel can correspond to one frequency band or one bandwidth under one frequency band. It should be noted that "under multi-link" can also be expressed as "under multiple links", "in multi-link", "in multiple links", "under multi-transmission link", "in multi-transmission links", "under multiple transmission links" and "in multiple transmission links". Here, the downlink data frame buffered by the AP may be data pre-buffered by the AP, which can also be data sent by a third-party device to the AP. As illustrated in FIG. 1, in the intelligent ammeter control system, the downlink data frame buffered by the AP 22 may be data sent to the AP 22 by the device of the power station control center 21 in the intelligent ammeter control system.

In this embodiment, the message frame may contain different information fields, and each information field may contain multiple bits. The value of each bit (i.e., "1" or "0") indicates different information respectively. Here, the message frame containing the first information and the second information may contain the first information field and the second information field. Here, the first information field may contain multiple bits, and each bit may be associated with a station. For example, 1000 bits may be associated with 1000 stations. When the bit value is "1", it means that the station corresponding to the bit has downlink data frames buffered by the AP. Here, the station indicated by an association identifier (AID) corresponding to a bit position has buffered downlink data frames by the AP. Here, the AID is assigned to the station by the AP when the AP is associated with the station. When the bit value is "0", it means that the station associated with the corresponding bit does not have downlink data frames buffered by the AP. Here, the second information field may contain a plurality of bits, and each bit is associated with a link between the station and the AP. When the bit value is "1", it means that the link between the station associated with the corresponding bit and the AP can transmit the downlink data frames. When the bit value is "0", it means that the link between the station associated with the corresponding bit and the AP cannot carry out the transmission of the downlink data frames. Here, after receiving the message frame containing the first information and the second information, the station can obtain the first information and the second information by analyzing the values corresponding to the bits of the message frame. Here, since the first information is configured to indicate that the downlink data frame for the station is buffered by the AP, and the second information is configured to instruct the station to receive the downlink data frame buffered by the AP under multi-link, the station can determine to receive the downlink data frames under multi-link. Here, after determining the first information configured to indicate that the downlink data frame for the station is buffered by the AP, the second information configured to instruct the station to receive the downlink data frame buffered by the AP under multi-link is determined. It should be noted that when the bit in the first information field is set to "0", the bit in the second information field is not set.

In S120, the message frame is sent.

In this embodiment, the message frame may be periodically sent by the AP to the station. The station learns the existence of the AP through the received message frame. Here, a distance between the station and the AP is set within a preset range to ensure that the station can receive the message frame sent by the AP. Here, the service area where the AP is located may include multiple stations. The message frame can be sent by broadcasting.

In embodiments of the disclosure, after receiving the message frame, the station can know based on the first information that the downlink data frame that needs to be acquired is buffered by the AP, and can know based on the second information that the downlink data frame buffered by the AP can be received under multi-link. Therefore, the station can receive the downlink data frame buffered by the AP under multi-link, which improves the rate and throughput of data transmission between the AP and the station, and reduces the delay of the data transmission.

FIG. 5 is a schematic diagram of a method for indicating transmission of a buffered downlink data frame under multi-link according to an embodiment of the disclosure. In step S110, generating the message frame containing the first information and the second information includes the following steps.

In S210, a beacon frame containing a first buffer indication field and a first link capability indication field is generated in response to the station receiving downlink data buffered by the AP in a contention manner, in which the first buffer indication field carries the first information, and the first link capability indication field carries the second information.

Here, whether the station receives the downlink data buffered by the AP in a contention manner can be set or specified during wireless networking. The AP can determine whether the station receives the downlink data buffered by the AP in a contention manner by detecting parameter information that has been set or specified. The beacon frame may be a management frame in wireless communication. A TIM (traffic indication map) may be included in the beacon frame. The first buffer indication field and the first link capability indication field may be in the TIM field. For example, as illustrated in FIG. 6, the first buffer indication field may be the AID field corresponding to the TIM field. Each bit included in the AID field may be associated with one station. If the AID field can contain multiple bits, the AID field can be associated with multiple stations. For example, 2008 bits of an AID can be associated with 2008 stations. When the bit corresponding to the station is "1", it means that the station has downlink data frames buffered by the AP. Here, the first buffer indication field carries information that the stations buffer the downlink data frames in the AP included in the first information.

It should be noted that, the first buffer indication field and the first link capability indication field may be set in other information fields of the TIM field, such as the X field in FIG. 6, where X field corresponds to one information field, and Y field may originally be a blank field. Alternatively, the first buffer indication field and the first link capability indication field may be set in other information fields in the beacon frame other than the TIM field. For example, as illustrated in FIG. 7, the first link capability indication field is set in the Y field, where the Y field corresponds to one information field, and the Y field may originally be a blank field. Each bit included in the Y field can be associated with one link between the station and the AP. Here, the first link capability indication field may contain multiple bits, and each bit is associated with one link. When the bit corresponding to the link is "1", it means that data transmission can be performed under the link. The first link capability indication field carries information that the station can perform data transmission under multi-link included in the second information.

In this embodiment, the first link capability indication field includes a plurality of first subfields, and each first subfield corresponds to one link between the AP and the station. Generating the beacon frame containing the first buffer indication field and the first link capability indication field, includes:

generating the beacon frame containing the first buffer indication field and the first subfields, in which a first subfield carries an enabling identifier configured to enable the link in response to a load of the link being less than a first preset threshold.

Figure 9:
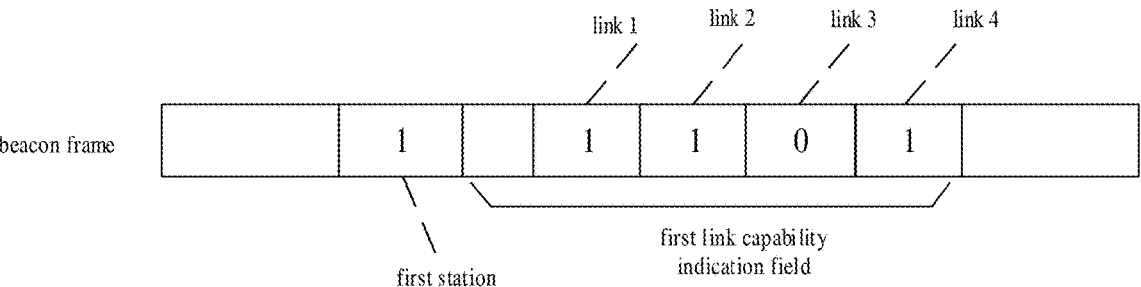
FIG. 9 is a schematic diagram of a beacon frame according to an embodiment of the disclosure.

In this embodiment, the first buffer indication field may be associated with specific stations, and a correspondence between the number of bits in the first buffer indication field and the station may be determined according to requirements. For example, as illustrated in FIG. 9, the first buffer indication field may be associated with a first station. The first buffer indication field may be associated with one station through one bit. This bit can be set to "1" when it is detected that the AP has buffered the downlink data frames sent to the station. The first buffer indication field may also be associated with one station through multiple bits. For example, if the first buffer indication field is associated with one station through 3 bits, when it is detected that the AP has buffered downlink data frames sent to the station, these 3 bits can be set to "001".

Figure 8:
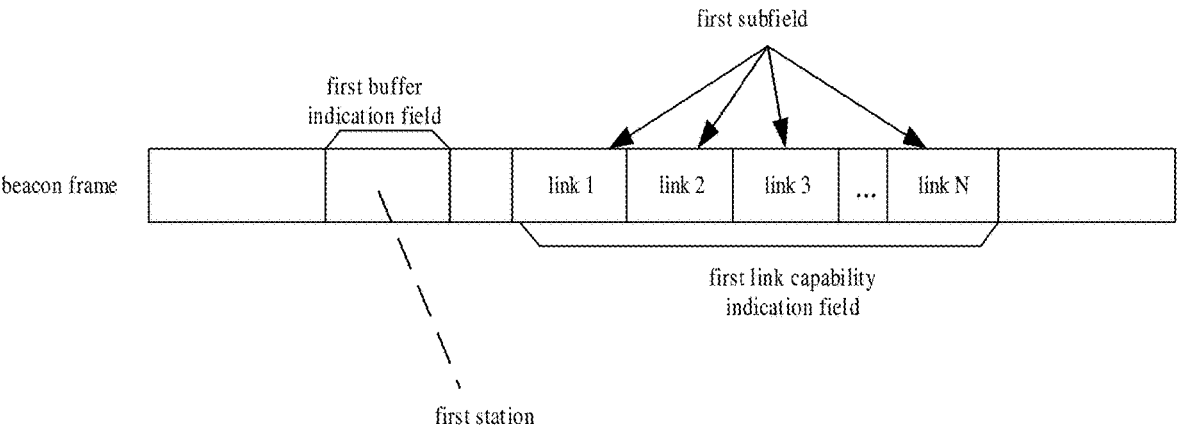
FIG. 8 is a schematic diagram of a beacon frame according to an embodiment of the disclosure.

In this embodiment, the first subfield is associated with each link between the AP and the station. For example, as illustrated in FIG. 8, the first link capability indication field includes a plurality of first subfields. The plurality of first subfields are associated with link 1, link 2, link 3, . . . , link N, respectively. The first subfield may correspond to one bit. Taking the link associated with the first subfield being link 1 as an example, when a load of the link 1 is less than a first preset threshold, this bit can be set to 1. The first subfield may also correspond to multiple bits. Taking the link associated with the first subfield being link 1 and the first subfield including 3 bits as an example, when a load of the link 1 is less than the first preset threshold, these 3 bits can be set to "001". Here, the plurality of first subfields may be set adjacent to each other in the beacon frame or may be set at intervals. Here, the first preset threshold can be flexibly set according to network requirements. For example, when the transmission performance of the link is required to be high, a small first preset threshold may be set. When the requirements for the transmission performance of the link are low, a large first preset threshold may be set. Here, the enabling identifier bit may include the value of the bit corresponding to the first subfield.

As illustrated in FIG. 9, in an embodiment, the first buffer indication field is associated with the first station. The first buffer indication field includes 1 bit, and the bit carries an enabling identifier "1", indicating that the AP buffers the downlink data frame of the first station. The first link capability indication field includes 4 first subfields, and the 4 first subfields are associated with link 1, link 2, link 3 and link 4 between the AP and the station respectively. The first preset threshold is set to 4. Link 1 connects 3 stations, link 2 connects 2 stations, link 3 connects 5 stations, and link 4 connects 1 station. Since only the loads of link 1, link 2, and link 4 are less than the first preset threshold, the bits of the first link capability indication field are set to 1101, instructing the station to receive the downlink data frames buffered by the AP under link 1, link 2 and link 3.

In this embodiment, generating the message frame containing the first information and the second information includes:

generating a CF-poll frame containing a second buffer indication field and a second link capability indication field in response to the station receiving the downlink data buffered by the AP in a contention-free manner, in which the first buffer indication field carries the first information, and the second link capability indication field carries the second information.

Figure 10:
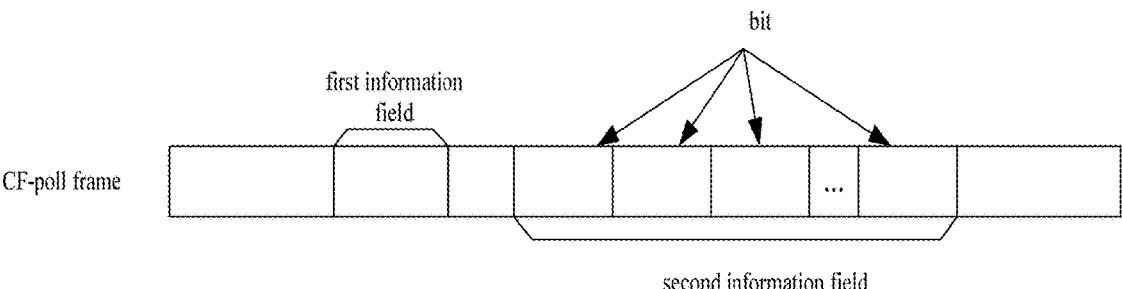
FIG. 10 is a schematic diagram of a CF-poll frame according to an embodiment of the disclosure.

Here, whether the station receives the downlink data buffered by the AP in a contention-free manner can be set or specified during the wireless networking. The AP may determine whether the station receives the downlink data buffered by the AP in a contention-free manner by detecting the parameter information that has been set or specified. The second buffer indication field and the second link capability indication field may be set in an information field included in the CF-poll frame. For example, as illustrated in FIG. 10, the second buffer indication field may be in the first information field included in the CF-poll frame. Here, each bit included in the second buffer indication field may be associated with one station. Here, the second buffer indication field may contain multiple bits, and the multiple bits may be associated with multiple stations. When the bit corresponding to the station is "1", it means that the station has downlink data frames buffered by the AP. Please refer to FIG. 10 again, the second link capability indication field is set in the second information field, and each bit included in the second information field can be associated with a link between the station and the AP. Here, the second link capability indication field may contain multiple bits, and multiple bits may be associated with multiple links. When the bit corresponding to the link is "1", it means that data transmission can be performed under the link.

In the embodiment, the second link capability indication field includes a plurality of second subfields, and each second subfield corresponds to one link between the AP and the station.

Receiving the downlink data frame buffered by the AP under multi-link based on the second information, includes:

receiving the downlink data frame buffered by the AP under multiple links indicated by the second subfields each carrying an enabling identifier, based on the second link capability indication field.

Figure 11:
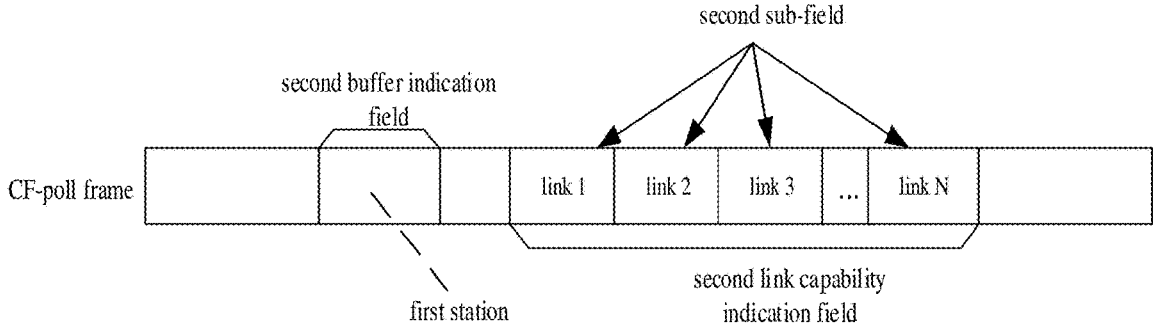
FIG. 11 is a schematic diagram of a CF-poll frame according to an embodiment of the disclosure.

In the embodiment, the second buffer indication field is associated with the stations. For example, as illustrated in FIG. 11, the second buffer indication field is associated with the first station. The second buffer indication field may be associated with one station through one bit. The bit can be set to 1 when it is detected that the AP has buffered downlink data frames sent to the station. The second buffer indication field may also be associated with one station through multiple bits. For example, if the second buffer indication field is associated with one station through 3 bits, when it is detected that the AP has buffered downlink data frames sent to the station, these 3 bits may be set to 001.

In the embodiment, the second subfield is associated with each link between the AP and the station. For example, as illustrated in FIG. 11, a plurality of second subfields are associated with link 1, link 2, link 3, . . . , link N, respectively. The second subfield may be associated with one link through one bit. Taking the link associated with the second subfield being link 1 as an example, when the load of the link 1 is less than a second preset threshold, this bit can be set to 1. The second subfield may also be associated with one link through a plurality of bits. Taking the link associated with the second subfield being link 1, and the second subfield being associated with one link through 3 bits as an example, when the load of the link 1 is less than the second preset threshold, these 3 bits may be set to 001. Here, the second subfields may be set adjacent to each other in the CF-poll frame, or may be set at intervals. Here, the second preset threshold can be flexibly set according to network requirements. For example, when the requirements of transmission performance of the links are high, a small second preset threshold may be set. When the requirements of transmission performance of the links are low, a large second preset threshold may be set. Here, the enabling identifier bit may include the value of the bit corresponding to the second subfield.

Figure 12:
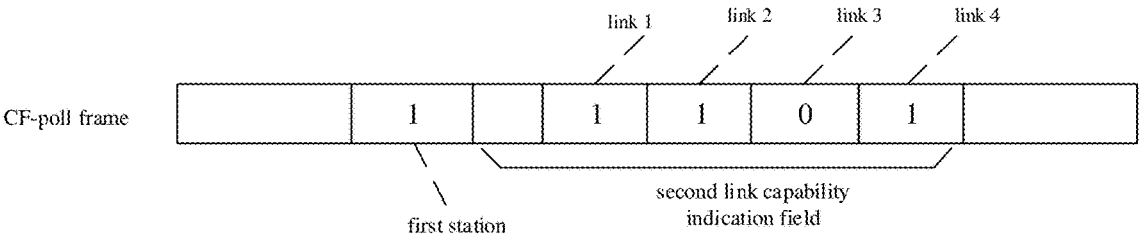
FIG. 12 is a schematic diagram of a CF-poll frame according to an embodiment of the disclosure.

As illustrated in FIG. 12, in an embodiment, the second buffer indication field is associated with the first station. The second buffer indication field is associated with one station through 1 bit, and the bit carries an enabling identifier "1", indicating that the AP buffers the downlink data frame of the first station. The second link capability indication field includes 4 second subfields, and the 4 second subfields are associated with link 1, link 2, link 3 and link 4 between the AP and the station respectively. The second preset threshold is set to 4. Link 1 connects 3 stations, link 2 connects 2 stations, link 3 connects 5 stations, and link 4 connects 1 station. Since only the loads of link 1, link 2, and link 4 are less than the second preset threshold, the bits of the second link capability indication field are set to 1101. The station may be instructed to receive downlink data frames buffered by the AP under link 1, link 2, and link 3.

Figure 13:
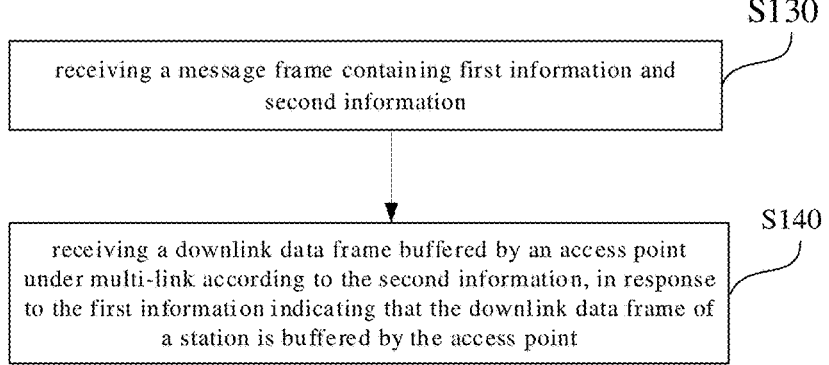
FIG. 13 is a schematic diagram of a method for receiving a buffered downlink data frame under multi-link according to an embodiment of the disclosure.

FIG. 13 is a schematic diagram of a method for receiving a buffered downlink data frame under multi-link according to an embodiment of the disclosure. The method is applied to a station. The method includes the following steps.

In S130, a message frame containing first information and second information is received.

In the embodiment, the message frame may be a message frame sent by the AP to the station. For example, in the intelligent ammeter control system, the message frame may be a message frame sent by the router device to the intelligent ammeter. Here, the message frame may be a beacon frame or a CF-poll frame.

In S140, a downlink data frame buffered by an AP is received under multi-link based on the second information, in response to the first information indicating that the downlink data frame of a station is buffered by the AP.

Here, the multi-link can be understood as multiple channels for transmitting data. For example, each link in the multi-link corresponds to a channel for transmitting data. It should be noted that "under multi-link" can also be expressed as "under multiple links", "in multi-link", "in multiple links", "under multi-transmission link", "in multi-transmission links", "under multiple transmission links" and "in multiple transmission links". The downlink data frame buffered by the AP may be data pre-buffered by the AP, which can also be data sent by a third-party device to the AP. For example, as illustrated in FIG. 1 again, in the intelligent ammeter control system, the downlink data frame buffered by the AP 22 may be data sent by the control center 21.

In the embodiment, the message frame may contain different information fields, and each information field may contain multiple bits. The value of each bit (i.e., "1" or "0") indicates different information respectively. Here, the message frame containing the first information and the second information may contain the first information field and the second information field. Here, the first information field may contain multiple bits, and each bit may be associated with one station. When the bit value is "1", it means that the station corresponding to the bit has downlink data frames buffered by the AP. Here, the station indicated by an AID corresponding to a bit position has downlink data frames buffered by the AP. Here, the AID is assigned to the station by the AP when the AP is associated with the station. When the bit value is "0", it means that the station associated with the corresponding bit does not buffer downlink data frames in the AP. Here, the second information field contains a plurality of bits, and each bit is associated with one link between the station and the AP. When the bit value is "1", it means that the link between the station associated with the corresponding bit and the AP can transmit the downlink data frames. When the bit value is "0", it means that the link between the station associated with the corresponding bit and the AP cannot carry out the transmission of the downlink data frames. Here, after receiving the message frame containing the first information and the second information, the station can obtain the first information and the second information by analyzing the values corresponding to the bits of the message frame. Since the first information is configured to indicate that the downlink data frame for the station is buffered by the AP, and the second information is configured to instruct the station to receive the downlink data frame buffered by the AP under multi-link, the station can determine to receive the downlink data buffered by the AP under multi-link.

In the embodiment, the message frame may be periodically received by the station, and the station learns the existence of the AP through the received message frame. Here, the distance between the station and the AP is within the preset range to ensure that the station can receive the message frame sent by the AP. Here, the service area where the AP is located may include multiple stations. The message frame can be sent by broadcasting.

In the embodiment, receiving the message frame containing the first information and the second information includes:

receiving a beacon frame containing a first buffer indication field and a first link capability indication field in response to obtaining downlink data buffered by the AP in a contention manner, in which the first buffer indication field carries the first information, and the first link capability indication field carries the second information.

Here, whether the station receives the downlink data buffered by the AP in a contention manner can be set or specified during the wireless networking. The AP may determine whether the station receives the downlink data buffered by the AP in a contention manner based on the detection of parameter information that has been set or specified. The beacon frame may be a management frame in wireless communication. A TIM field may be included in the beacon frame. The first buffer indication field and the first link capability indication field may be set in the TIM field. For example, as illustrated in FIG. 7, the first buffer indication field may be in the AID field corresponding to the TIM field. Here, each bit included in the AID may be associated with one station. Here, the AID may contain multiple bits. When the bit corresponding to the station is "1", it means that the station has downlink data frames buffered by the AP.

It should be noted that, the first buffer indication field and the first link capability indication field may be set in other information fields of the TIM field, such as the X field in FIG. 6, or may be set in other information fields in the beacon frame. For example, as illustrated in FIG. 7 again, the first link capability indication field is set in the Y field other than the TIM field. Each bit included in the Y field may be associated with one link between the station and the AP. Here, the first link capability indication field may contain multiple bits, and the multiple bits are associated with multiple links. When the bit corresponding to the link is "1", it means that data transmission can be performed under the link.

In the embodiment, the first link capability indication field includes a plurality of first subfields, and each first subfield corresponds to one link between the AP and the station.

Receiving the downlink data frame buffered by the AP under multi-link based on the second information, includes:

receiving r the downlink data frame buffered by the AP under multi-link indicated by the first subfields each carrying an enabling identifier, based on the first link capability indication field.

In the embodiment, the first buffer indication field is associated with specific stations. For example, as illustrated in FIG. 8 again, the second buffer indication field is associated with the first station. The first buffer indication field may be associated with one station through one bit. This bit can be set to 1 when it is detected that the AP has buffered downlink data frames sent to the station. The first buffer indication field may also be associated with one station through multiple bits. For example, if the first buffer indication field is associated with one station through 3 bits, when it is detected that the AP has buffered downlink data frames sent to the station, these 3 bits may be set to 001.

In the embodiment, the first subfield is associated with each link between the AP and the station. For example, as illustrated in FIG. 8 again, the first link capability indication field includes a plurality of first subfields, and each first subfield is associated with link 1, link 2, link 3, . . . , link N, respectively. A first subfield may be associated with one link by one bit. Taking the link associated with the first subfield being link 1 as an example, when a load of the link 1 is less than the first preset threshold, this bit can be set to 1. The first subfield may also be associated with one link through a plurality of bits. Taking the link associated with the first subfield being link 1 and the first subfield being associated with the link through 3 bits as an example, when a load of the link 1 is less than the first preset threshold, these 3 bits can be set to "001". Here, the plurality of first subfields may be set adjacent to each other in the beacon frame or may be set at intervals. The first preset threshold can be flexibly set according to network requirements. For example, when the requirements for transmission performance of the links are high, a small first preset threshold may be set. When the requirements for the transmission performance of the links are low, a large first preset threshold may be set. Here, the enabling identifier bit may include the value of the bit corresponding to the first subfield.

As illustrated in FIG. 9 again, in an embodiment, the first buffer indication field is associated with the first station. The first buffer indication field is associated with one station through 1 bit, and the bit carries an enabling identifier "1", indicating that the AP buffers the downlink data frame of the first station. The second link capability indication field includes 4 first subfields, and the 4 first subfields are associated with link 1, link 2, link 3 and link 4 between the AP and the station respectively. The first preset threshold is set to 4. Link 1 connects 3 stations, link 2 connects 2 stations, link 3 connects 5 stations, and link 4 connects 1 station. Since only the loads of link 1, link 2, and link 4 are less than the first preset threshold, the bits of the first link capability indication field are set to 1101. The station may be instructed to receive the downlink data frames buffered by the AP under link 1, link 2 and link 3.

In the embodiment, receiving the message frame containing the first information and the second information includes:
  receiving a CF-poll frame containing a first buffer indication field and a second link capability indication field in response to receiving the downlink data buffered by the AP in a contention-free manner, wherein the first buffer indication field carries the first information, and the second link capability indication field carries the second information.

Here, whether the station receives the downlink data buffered by the AP in a contention-free manner can be set or specified during the wireless network networking. The AP may determine whether the station receives the downlink data buffered by the AP in a contention-free manner by detecting the parameter information that has been set or specified. The second buffer indication field and the second link capability indication field may be set in an information field included in the CF-poll frame. For example, as illustrated in FIG. 10 again, the second buffer indication field may be in the first information field included in the CF-poll frame. Here, each bit included in the second buffer indication field may be associated with one station. Here, the second buffer indication field may contain multiple bits. When the bit corresponding to the station is "1", it means that the station has downlink data frames buffered by the AP. The second information includes information that the station has downlink data frames buffered by the AP. As illustrated in FIG. 10 again, the second link capability indication field is set in the second information field, and each bit included in the second information field can be associated with one link between the station and the AP. Here, the second link capability indication field may contain multiple bits. When the bit corresponding to the link is "1", it means that data transmission can be performed under the link.

In the embodiment, the second link capability indication field includes a plurality of second subfields, and each second subfield corresponds to one link between the AP and the station.

Receiving the downlink data frame buffered by the AP under multi-link based on the second information, includes:
  receiving the downlink data frame buffered by the AP under multiple links indicated by the second subfields each carrying the enabling identifier, based on the second link capability indication field.

In the embodiment, the second buffer indication field is associated with specific stations. For example, as illustrated in FIG. 11 again, the second buffer indication field is associated with the first station. The second buffer indication field may be associated with one station through 1 bit. The bit can be set to 1 when it is detected that the AP has buffered downlink data frames sent to the station. The second buffer indication field may also be associated with one station through multiple bits. For example, if the second buffer indication field is associated with one station through 3 bits, when it is detected that the AP has buffered downlink data frames sent to the station, these 3 bits may be set to 001.

In the embodiment, the second subfield is associated with each link between the AP and the station. For example, as illustrated in FIG. 11 again, a plurality of second subfields are associated with link 1, link 2, link 3, . . . , link N, respectively. A second subfield may be associated with one link through one bit. Taking the link associated with the second subfield being link 1 as an example, when the load of the link 1 is less than the second preset threshold, this bit can be set to 1. The second subfield may also be associated with one link through a plurality of bits. Taking the link associated with the second subfield being link 1, and the second subfield being associated with the link through 3 bits as an example, when the load of the link 1 is less than the second preset threshold, these 3 bits may be set to 001. Here, the plurality of second subfields may be set adjacent to each other in the CF-poll frame, or may be set at intervals. Here, the second preset threshold can be flexibly set according to network requirements. For example, when the requirements for the transmission performance of the links are high, a small second preset threshold may be set. When the requirements for the transmission performance of the links are low, a large second preset threshold may be set. The enabling identifier bit may include the value of the bit corresponding to the second subfield.

As illustrated in FIG. 12 again, in an embodiment, the second buffer indication field is associated with the first station. The second buffer indication field is associated with one station through 1 bit, and the bit carries an enabling identifier "1", indicating that the AP buffers the downlink data frame of the first station. The second link capability indication field includes 4 second subfields, and the 4 second subfields are associated with link 1, link 2, link 3 and link 4 between the AP and the station respectively. The second preset threshold is set to 4. Link 1 connects 3 stations, link 2 connects 2 stations, link 3 connects 5 stations, and link 4 connects 1 station. Since only the loads of link 1, link 2, and link 4 are less than the second preset threshold, the bits of the second link capability indication field are set to 1101. The station may be instructed to receive downlink data frames buffered by the AP under link 1, link 2, and link 4.

Figure 14:
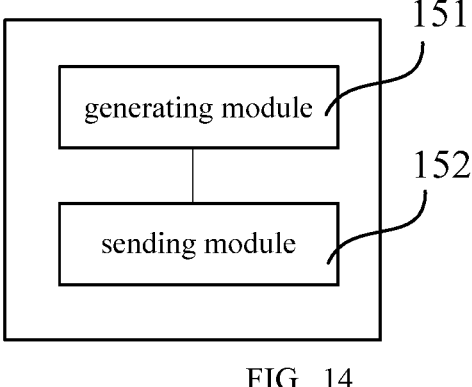
FIG. 14 is a schematic diagram of an apparatus for indicating transmission of a buffered downlink data frame under multi-link according to an embodiment of the disclosure.

FIG. 14 is a schematic diagram of an apparatus for indicating transmission of a buffered downlink data frame under multi-link according to an embodiment of the disclosure. The apparatus is applied to an AP, and includes a generating module 151 and a sending module 152.

The generating module 151 is configured to generate a message frame containing first information and second information, in which the first information is configured to indicate that a downlink data frame of a station is buffered by an AP, and the second information is configured to instruct the station to receive the downlink data frame buffered by the AP under multi-link.

The sending module 152 is configured to send the message frame.

In an embodiment, the generating module is further configured to: generate a beacon frame containing a first buffer indication field and a first link capability indication field in response to the station receiving downlink data buffered by the AP in a contention manner, in which the first buffer indication field carries the first information, and the first link capability indication field carries the second information.

In an embodiment, the first link capability indication field includes a plurality of first subfields, each first subfield corresponds to one link between the AP and the station, and the generating module 151 is further configured to: generate the beacon frame containing the first buffer indication field and the plurality of first subfields, in which a first subfield carries an enabling identifier configured to enable the corresponding link in response to a load of the link being less than a first preset threshold.

In an embodiment, the generating module 151 is further configured to: generate a CF-poll frame containing a second buffer indication field and a second link capability indication field in response to the station receiving downlink data buffered by the AP in a contention-free manner, in which the first buffer indication field carries the first information, and the second link capability indication field carries the second information.

In an embodiment, the second link capability indication field includes a plurality of second subfields, and each second subfield corresponds to one link between the AP and the station.

The generating module 151 is further configured to: generate a CF-poll frame containing the second buffer indication field and the plurality of second subfields, in which a second subfield carries an enabling identifier configured to enable the corresponding link in response to a load of the link being less than a second preset threshold.

Figure 15:
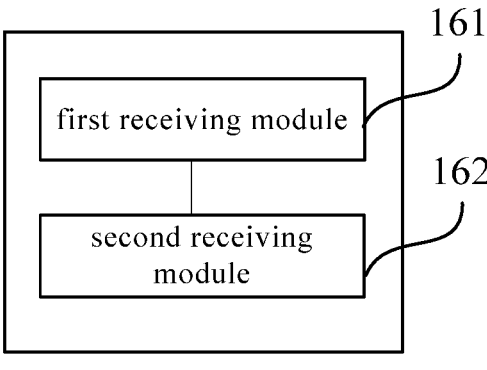
FIG. 15 is a schematic diagram of an apparatus for receiving a buffered downlink data frame under multi-link according to an embodiment of the disclosure.

FIG. 15 is a schematic diagram of an apparatus for receiving a buffered downlink data frame under multi-link according to an embodiment of the disclosure. The apparatus is applied to a station, and includes a first receiving module and a second receiving module.

The first receiving module 161 is configured to receive a message frame containing first information and second information.

The second receiving module 162 is configured to receive a downlink data frame buffered by an AP under multi-link based on the second information, in response to the first information indicating that the downlink data frame of a station is buffered by the AP.

In an embodiment, the first receiving module 161 is further configured to: receive a beacon frame containing a first buffer indication field and a first link capability indication field in response to obtaining downlink data buffered by the AP in a contention manner, in which the first buffer indication field carries the first information, and the first link capability indication field carries the second information.

In an embodiment, the first link capability indication field includes a plurality of first subfields, each first subfield corresponds to one link between the AP and the station.

The second receiving module 162 is further configured to: receive the downlink data frame buffered by the AP under multi-link indicated by the first subfields carrying an enabling identifier, based on the first link capability indication field.

In an embodiment, the first receiving module 161 is further configured to: receive a CF-poll frame containing a first buffer indication field and a second link capability indication field in response to receiving downlink data buffered by the AP in a contention-free manner, in which the first buffer indication field carries the first information, and the second link capability indication field carries the second information.

In an embodiment, the second link capability indication field includes a plurality of second subfields, and each second subfield corresponds to one link between the AP and the station.

The second receiving module 162 is further configured to: receive the downlink data frame buffered by the AP under multiple links indicated by the second subfields each carrying an enabling identifier, based on the second link capability indication field.

Embodiments of the disclosure also provide a communication device. The communication device includes:

an antenna;

a memory; and a processor, connected to the antenna and the memory respectively, and configured to control the antenna to transmit and receive radio signals by executing computer-executable instructions stored on the memory, to implement steps of a method for indicating transmission of a buffered downlink data frame under multi-link or a method for receiving a buffered downlink data frame under multi-link provide by any one of the above technical solutions.

The communication device provided in the embodiments may be the above terminal or base station. The terminal may include various types of manned terminals or vehicle-mounted terminals. The base station may include various types of base stations, such as, a 4G base station or a 5G base station.

The antennas may include various types of antennas, for example, mobile antennas such as 3G antenna, 4G antenna or 5G antenna. The antennas may also include: Wi-Fi antennas or wireless charging antennas.

The memory may include various types of storage mediums. The storage mediums are non-transitory computer storage mediums that can continue to memorize the information stored thereon after the communication device is powered off.

The processor is connected to the antenna and the memory through a bus, and is configured to read the executable programs stored on the memory, for example, at least one of the methods shown in FIG. 4, FIG. 5, and FIG. 13.

Embodiments of the disclosure further provide a non-transitory computer-readable storage medium. The non-transitory computer-readable storage medium stores executable programs. When the executable programs are executed by a processor, steps of a method for indicating transmission of a buffered downlink data frame under multi-link or a method for receiving a buffered downlink data frame under multi-link provide by any one of the above technical solutions can be implemented, for example, at least one of the methods shown in FIG. 4, FIG. 5, and FIG. 13.

Figure 16:
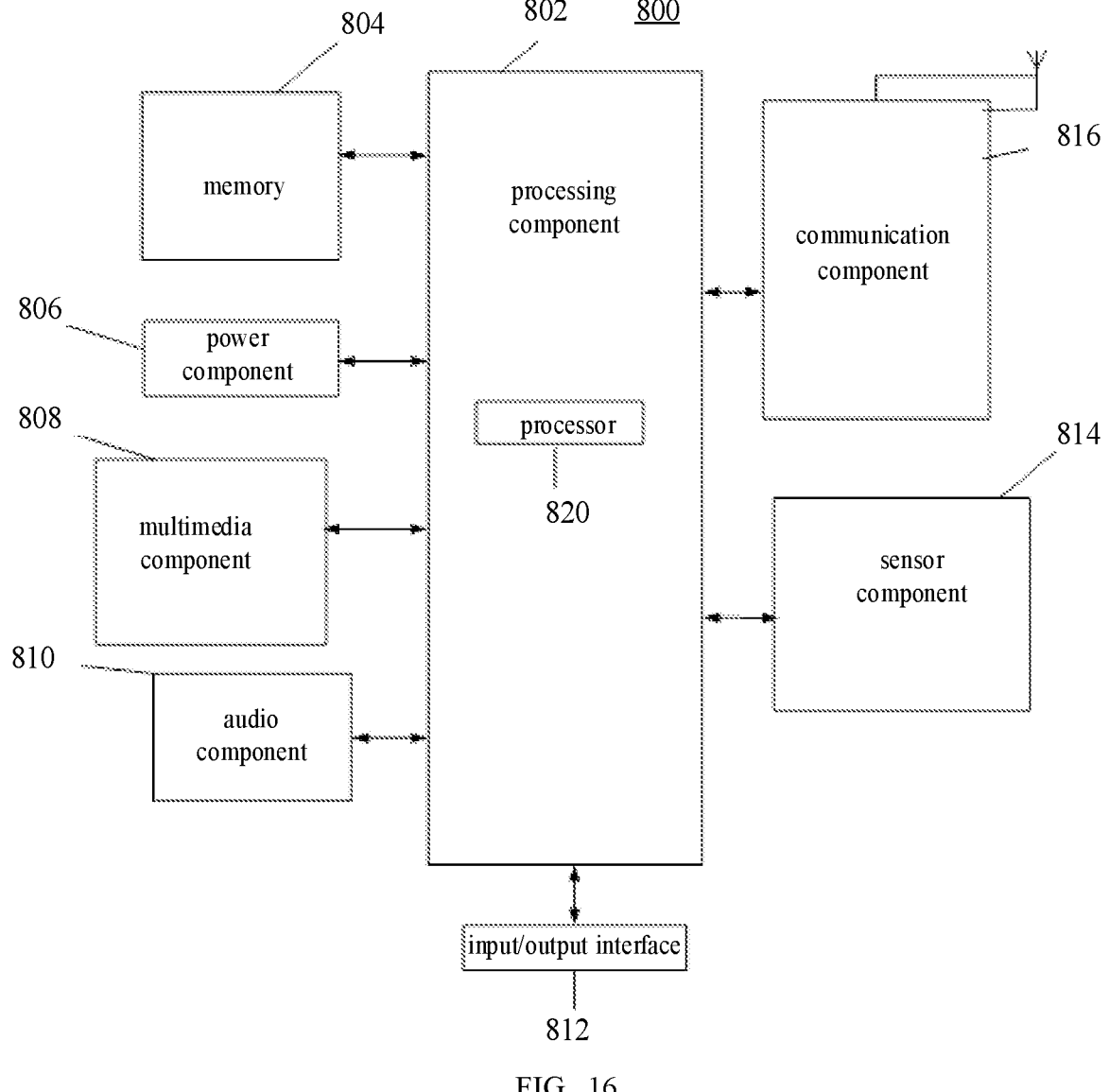
FIG. 16 is a schematic diagram of a terminal according to an embodiment of the disclosure.

As illustrated in FIG. 16, embodiments of the disclosure provide a structure of a terminal.

The embodiment of FIG. 16 provides a terminal 800. The terminal may be a mobile phone, a computer, a digital broadcasting terminal, a message transceiver device, a game console, a tablet device, a medical device, a fitness device and a personal digital assistant.

As illustrated in FIG. 16, the terminal 800 may include one or more of the following components: a processing component 802, a memory 804, a power component 806, a multimedia component 808, an audio component 810, an input/output (I/O) interface 812, a sensor component 814, and a communication component 816.

The processing component 802 generally controls overall operation of the terminal 800, such as the operations associated with display, telephone calls, data communications, camera operations, and recording operations. The processing component 802 may include one or more processors 820 to execute instructions to perform all or part of the steps in the above described method. Moreover, the processing component 802 may include one or more modules which facilitate the interaction between the processing component 802 and other components. For instance, the processing component 802 may include a multimedia module to facilitate the interaction between the multimedia component 808 and the processing component 802.

The memory 804 is configured to store various types of data to support the operation of the terminal 800. Examples of such data include instructions for any applications or methods operated on the terminal 800, contact data, phonebook data, messages, pictures, video, etc. The memory 804 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the terminal 800. The power component 806 may include a power management system, one or more power sources, and any other components associated with the generation, management, and distribution of power in the terminal 800.

The multimedia component 808 includes a screen providing an output interface between the terminal 800 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 808 includes a front-facing camera and/or a rear-facing camera. When the terminal 800 is in an operating mode, such as a shooting mode or a video mode, the front-facing camera and/or the rear-facing camera can receive external multimedia data. Each front-facing camera and rear-facing camera may be a fixed optical lens system or has focal length and optical zoom capability.

The audio component 810 is configured to output and/or input audio signals. For example, the audio component 810 includes a microphone (MIC) configured to receive an external audio signal when the terminal 800 is in an operation mode, such as a call mode, a recording mode, and a voice recognition mode. The received audio signal may be further stored in the memory 804 or transmitted via the communication component 816. In some embodiments, the audio component 810 further includes a speaker to output audio signals.

The I/O interface 812 provides an interface between the processing component 802 and peripheral interface modules, such as a keyboard, a click wheel, buttons, and the like. The buttons may include, but are not limited to, a home button, a volume button, a starting button, and a locking button.

The sensor component 814 includes one or more sensors to provide status assessments of various aspects of the terminal 800. For instance, the sensor component 814 may detect an open/closed status of the terminal 800, relative positioning of components, e.g., the display and the keypad, of the terminal 800, a change in position of the terminal 800 or a component of the terminal 800, a presence or absence of user contact with the terminal 800, an orientation or an acceleration/deceleration of the terminal 800, and a change in temperature of the terminal 800. The sensor component 814 may include a proximity sensor configured to detect the presence of nearby objects without any physical contact. The sensor component 814 may also include a light sensor, such as a CMOS or CCD image sensor, for use in imaging applications. In some embodiments, the sensor component 814 may also include an accelerometer sensor, a gyroscope sensor, a magnetic sensor, a pressure sensor, or a temperature sensor.

The communication component t 816 is configured facilitate communication, wired or wirelessly, between the terminal 800 and other devices. The terminal 800 can access a wireless network based on a communication standard, such as WiFi, 2G, or 3G, or a combination thereof. In an exemplary embodiment, the communication component 816 receives a broadcast signal or broadcast associated information from an external broadcast management system via a broadcast channel. In an exemplary embodiment, the communication component 816 further includes a near field communication (NFC) module to facilitate short-range communications. For example, the NFC module may be implemented based on a radio frequency identity (RFID) technology, an infrared data association (IrDA) technology, an ultra-wideband (UWB) technology, a Bluetooth (BT) technology, and other technologies.

In exemplary embodiments, the terminal 800 may be implemented with one or more application specific integrated circuits (ASICs), digital signal processors (DSPs), digital signal processing devices (DSPDs), programmable logic devices (PLDs), field programmable gate arrays (FP-GAs), controllers, micro-controllers, microprocessors, or other electronic components, for performing the above described method.

In exemplary embodiments, there is also provided a non-transitory computer readable storage medium including instructions, such as included in the memory 804, executable by the processor 820 in the terminal 800, for performing the above method. For example, the non-transitory computer-readable storage medium may be a ROM, a RAM, a CD-ROM, a magnetic tape, a floppy disc, an optical data storage device, and the like.

The terminal can be configured to implement the above methods, for example, the methods shown in FIG. 4, FIG. 5 and FIG. 13.

Figure 17:
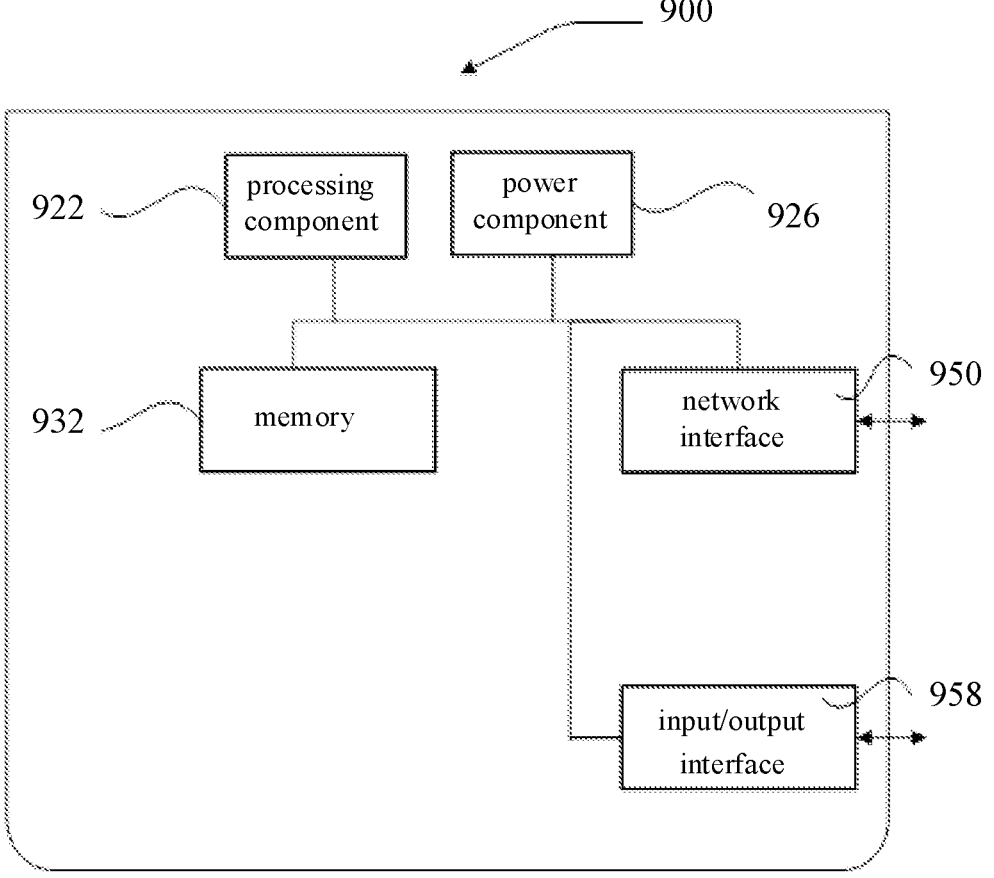
FIG. 17 is a schematic diagram of a base station according to an embodiment of the disclosure.

As illustrated in FIG. 17, the embodiment of the disclosure provides a structure of a base station 900. For example, the base station 900 may be provided as a network-side device. As illustrated in FIG. 17, the base station 900 includes a processing component 922, which further includes one or more processors, and a memory resource represented by a memory 932 for storing instructions executable by the processing component 922, such as application programs. The application programs stored in the memory 932 may include one or more modules, each module corresponds to a set of instructions. In addition, the processing component 922 is configured to execute the instructions to perform any of the above methods, e.g., the methods shown in FIG. 4, FIG. 5 and FIG. 13.

The base station 900 may include a power component 926 configured to perform power management for the base station 900, a wired or wireless network interface 950 configured to connect the base station 900 to a network, and an input/output (I/O) interface 958. The base station 900 may operate based on an operating system stored in the memory 932, such as Windows Server™, Mac OS X™, Unix™, Linux™, FreeBSD™ or the like.

The wireless network interface 950 includes, but is not limited to, the antenna of the communication device. Other embodiments of the disclosure will be apparent to those skilled in the art from consideration of the specification and practice of the disclosure disclosed here. This application is intended to cover any variations, uses, or adaptations of the disclosure following the general principles thereof and including such departures from the disclosure as come within known or customary practice in the art. It is intended that the specification and examples be considered as exemplary only, with a true scope and spirit of the disclosure being indicated by the following claims.

It will be appreciated that the disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method for indicating transmission of a buffered downlink data frame in multi-link, comprising:

generating, by an access point, a message frame containing first information and second information, wherein the first information is configured to indicate that a downlink data frame for a station is buffered by the access point, and the second information is configured to instruct the station to receive the downlink data frame buffered by the access point in multi-link; wherein link capability indication field of the message frame comprises a plurality of bits, the plurality of bits are associated with the multi-link respectively, and each bit indicates whether data transmission is available on a corresponding link; and sending, by the access point, the message frame;

wherein the multi-link corresponds to different bandwidths in different frequency bands.

2. The method of claim 1, wherein generating the message frame containing the first information and the second information comprises:

generating a beacon frame containing a first buffer indication field and a first link capability indication field in response to the station receiving downlink data buffered by the access point in a contention manner, wherein the first buffer indication field carries the first information, and the first link capability indication field carries the second information.

3. The method of claim 2, wherein the first link capability indication field comprises a plurality of first subfields, each first subfield corresponds to one link between the access point and the station, and generating the beacon frame containing the first buffer indication field and the first link capability indication field, comprises:

generating the beacon frame containing the first buffer indication field and the plurality of first subfields, wherein the first subfield carries an enabling identifier configured to enable the link in response to a load of the link being less than a first preset threshold.

4. The method of claim 1, wherein generating the message frame containing the first information and the second information comprises:

generating a contention-free (CF)-poll frame containing a second buffer indication field and a second link capability indication field in response to the station receiving downlink data buffered by the access point in a contention-free manner, wherein the second buffer indication field carries the first information, and the second link capability indication field carries the second information.

5. The method of claim 4, wherein the second link capability indication field comprises a plurality of second subfields, each second subfield corresponds to one link between the access point and the station; and generating the CF-poll frame containing the second buffer indication field and the second link capability indication field, comprises:

generating the CF-poll frame containing the second buffer indication field and the plurality of second subfields, wherein the second subfield carries an enabling identifier configured to enable the link in response to a load of the link being less than a second preset threshold.

6. A method for receiving a buffered downlink data frame in multi-link comprising:

receiving, by a station, a message frame containing first information and second information; wherein link capability indication field of the message frame comprises a plurality of bits, the plurality of bits are associated with the multi-link respectively, and each bit indicates whether data transmission is available on a corresponding link; and receiving, by the station, a downlink data frame buffered by an access point in multi-link based on the second information, in response to the first information indicating that the downlink data frame for the station is buffered by the access point;

wherein the multi-link corresponds to different bandwidths in different frequency bands.

7. The method of claim 6, wherein receiving the message frame containing the first information and the second information comprises:

receiving a beacon frame containing a first buffer indication field and a first link capability indication field in response to obtaining downlink data buffered by the access point in a contention manner, wherein the first buffer indication field carries the first information, and the first link capability indication field carries the second information.

8. The method of claim 7, wherein the first link capability indication field comprises a plurality of first subfields, each first subfield corresponds to one link between the access point and the station; and receiving the downlink data frame buffered by the access point in multi-link based on the second information, comprises:

receiving the downlink data frame buffered by the access point in multiple links indicated by the first subfields each carrying an enabling identifier, based on the first link capability indication field.

9. The method of claim 6, wherein receiving the message frame containing the first information and the second information comprises:

receiving a CF-poll frame containing a first buffer indication field and a second link capability indication field in response to receiving downlink data buffered by the access point in a contention-free manner, wherein the first buffer indication field carries the first information, and the second link capability indication field carries the second information.

10. The method of claim 9, wherein the second link capability indication field comprises a plurality of second subfields, each second subfield corresponds to one link between the access point and the station; and receiving the downlink data frame buffered by the access point in multi-link based on the second information, comprises:

receiving the downlink data frame buffered by the access point in multiple links indicated by the second subfields each carrying an enabling identifier, based on the second link capability indication field.

11. A station, configured to implement the method of claim 6, comprising:

a processor; and a memory, configured to store instructions executable by the processor; and wherein the processor is configured to execute the instructions stored in the memory, so as to implement the method of claim 6.

12. An access point, comprising:

an antenna;

a memory; and a processor, connected to the antenna and the memory respectively, and configured to control the antenna to transmit and receive radio signals by executing computer-executable instructions stored on the memory, to implement a method for indicating transmission of a buffered downlink data frame in multi-link, the method comprising:

generating a message frame containing first information and second information, wherein the first information is configured to indicate that a downlink data frame for a station is buffered by the access point, and the second information is configured to instruct the station to receive the downlink data frame buffered by the access point in multi-link; wherein connection link indication field of the message frame comprises a plurality of bits, the plurality of bits are associated with the multi-link respectively, and each bit indicates whether data transmission is available on a corresponding link; and sending the message frame;

wherein the multi-link corresponds to different bandwidths in different frequency bands.

13. The access point of claim 12, wherein the processor is configured to:

generate a beacon frame containing a first buffer indication field and a first link capability indication field in response to the station receiving downlink data buffered by the access point in a contention manner, wherein the first buffer indication field carries the first information, and the first link capability indication field carries the second information.

14. The access point of claim 13, wherein the first link capability indication field comprises a plurality of first subfields, each first subfield corresponds to one link between the access point and the station, and the processor is configured to:

generate the beacon frame containing the first buffer indication field and the plurality of first subfields, wherein the first subfield carries an enabling identifier configured to enable the link in response to a load of the link being less than a first preset threshold.

15. The access point of claim 12, wherein the processor is configured to:

generate a contention-free (CF)-poll frame containing a second buffer indication field and a second link capability indication field in response to the station receiving downlink data buffered by the access point in a contention-free manner, wherein the second buffer indication field carries the first information, and the second link capability indication field carries the second information.

16. The access point of claim 15, wherein the second link capability indication field comprises a plurality of second subfields, each second subfield corresponds to one link between the access point and the station; and the processor is configured to:

generate the CF-poll frame containing the second buffer indication field and the plurality of second subfields, wherein the second subfield carries an enabling identifier configured to enable the link in response to a load of the link being less than a second preset threshold.

* * * * *